Patented Dec. 18, 1951

2,578,698

UNITED STATES PATENT OFFICE 2,578,698

DEHYDRATION OF ORGANIC ACIDS

William E. Hanford, Short Hills, N. J., assignor to The M. W. Kellogg Company, Jersey City, N. J., a corporation of Delaware No Drawing. Application September 24, 1948, Serial No. 51,107

13 Claims. (Cl. 260—450)

This invention relates to the dehydration of organic acids. More particularly, the invention relates to and has for its object an improved method for the dehydration of organic acids having at least two carbon atoms per molecule. Still more particularly, the invention relates to and has for its object an improved method for the dehydration of organic acids having at least two carbon atoms per molecule, which may be present in admixture with heavier organic acids, obtained as products from the condensation of the reaction effluent produced in processes for the catalytic hydrogenation of oxides of carbon.

In present day commercial operations, it is the preferred general practice to dehydrate mixtures of organic acids either in the liquid or vapor state with liquid selective solvents to produce extract and raffinate phases, separating the two phases from each other, removing the solvent from at least one of these phases to produce a solvent-free raffinate and/or extract, and usually recovering the removed solvent for further contact with more of the aqueous mixture of acids to be dehydrated. These steps, common to all solvent extraction processes both liquid-liquid and vapor-liquid (including extractive distillation), may be carried out in any suitable manner known to those skilled in the art, and are particularly applicable to processes for the dehydration of acetic and higher boiling acids, either individually or in admixture, obtained as products from the aforementioned condensation of the reaction effluent produced in processes for the catalytic hydrogenation of oxides of carbon.

Solvents generally employed for the extraction of the aforementioned relatively light organic acids, comprising organic acids having at least two carbon atoms per molecule, may be classified into three general classes, namely, single, relatively low-boiling solvents; mixed, relatively low-boiling solvents; and single, relatively high-boiling solvents, each class of solvents requiring a different method of handling in order to attain the optimum and most economically efficient extraction. Solvents falling within the first class (single, relatively low-boiling solvents), such as methyl n-propyl ketone, diethyl ketone, ethyl acetate, ethyl ether, or isopropyl ether, are generally employed which are capable of removing as a water azeotrope, all water which is soluble in the resulting extract phase, and which preferably form heterogeneous azeotropes with water. It has been found, however, that such systems require in addition to the extraction column, two solvent recovery fractionating columns, thus imposing a principal limitation upon this class of solvents embodying the necessity of distilling relatively large quantities of solvent from relatively small quantities of acid. When employing solvents falling within the second class (mixed, relatively low-boiling solvents), such as mixtures of methyl ethyl ketone and isopropyl ether in varying ratios, for example, from 1:1 to 1:3, the solubility of one component (for example, methyl ethyl ketone) in the resulting raffinate phase, makes it imperative from an economic standpoint to employ the other component of the mixture (for example, isopropyl ether) to extract the first component from the raffinate. In this respect, it has been found that in addition to the extraction column and the two solvent recovery fractionating columns required, (as when using single, relatively low-boiling solvents) an additional column is required to separate the components of the mixture. Hence, there is imposed a principal limitation upon this class of solvents embodying the necessity of special handling of the individual components and the distillation of relatively large quantities of solvent from relatively small quantities of acid.

In employing solvents falling within the third class (single, relatively high-boiling solvents), such as ditetrahydrofuryl pentane, ethyl hexyl "Cellosolve" (mono 2-ethyl-hexyl ether of ethylene glycol), dibutyl "Carbitol" (dibutyl ether of diethylene glycol), dibutyl "Cellosolve" (dibutyl ether of ethylene glycol), caproic acid, 1,4-diethoxy butane, 4,4-diethoxy dibutyl ether, polyalkoxy ether or 4,4-dibutoxy dibutyl ether, it has been found that no additional columns are required to obtain an extract phase comprising substantially all of the acids present in the aqueous feed and relatively large quantities of solvent. In this respect, it may be desirable, although not necessary, depending upon the degree of dehydration desired, to effect further dehydration of the resulting extract phase by the use of an extraneous entraining agent. The chief overall advantage is attained, in using solvents of this class, by producing an extract phase in which the boiling point of the solvent is substantially higher than that of the acids present, thus readily obtaining the distillation of the former from the latter, which cannot be effected when using the relatively low-boiling solvents of the first two classes. Thus, the economic employment of single, relatively high-boiling solvents, depends upon the utilization of those which are substantially insoluble in the resulting raffinate phase or which are sufficiently low in cost as to permit their being discarded with the raffinate.

I have now found that in using single, relatively high-boiling solvents of the aforementioned third class, optimum results are obtained with the class of dialkyl amides of organic acids as solvents for organic acids, generally, and organic acids having at least two carbon atoms per molecule, specifically, wherein these acids are present in aqueous solutions. In this respect, I have found that the dialkyl amides are generally superior to any of the solvents comprising the aforementioned classes, by reason of the excellent acid distribution characteristics obtained, on a comparative basis, in effecting the aforementioned acid dehydration. These dialkyl amides have the general chemical formula:

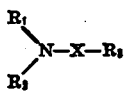

where

R₁, R₂, and R₃ are organic radicals

X is a radical, which upon hydrolysis of the general chemical formula yields an acid.

It should be noted that while X may be any radical which upon hydrolysis of the compound of the general chemical formula will yield an acid, I particularly prefer those compounds in which X may be CO, SO, SO₂, or PO.

While any of the dialkyl amides of organic acids are highly effective in extracting organic acids, in general, from their aqueous solutions, certain dialkyl amides are particularly desirable in dehydrating relatively light organic acids boiling as low as acetic acid, obtained as aqueous solutions in processes for the catalytic hydrogenation of oxides of carbon. Hence, such extractants comprising dialkyl amides of organic acids may be employed as dimethylamide of oleic acid, dimethylamide of tolylstearic acid and dimethylamide of phenylstearic acid.

The following table indicates comparative data obtained employing representative solvents of the aforementioned classes of single, relatively low-boiling solvents; mixed, relatively low-boiling solvents; single, relatively high-boiling solvents; and the aforementioned alkyl amides of fatty organic acids. The various solvents are listed in order of extraction efficiency, as indicated by respective partition ratios, the latter being defined as the ratio of acid present in the extract to that present in an equal volume of raffinate resulting from a single contact.

Table I

| | Solvent | Partition Ratio |
|---|---|---|
| single low-boiling solvents. | diethyl ketone | 0.70 |
| | ethyl acetate | 0.69 |
| | ethyl ether | 0.53 |
| | isopropyl ether | 0.22 |
| mixed low-boiling solvents. | 50/50 {methyl ethyl ketone / isopropyl ether} | 0.57 |
| | 25/75 {methyl ethyl ketone / isopropyl ether} | 0.37 |
| single high-boiling solvents. | ditetrahydrofuryl pentane | 0.61 |
| | ethyl hexyl "Cellosolve" | 0.58 |
| | dibutyl "Carbitol" | 0.43 |
| | dibutyl "Cellosolve" | 0.24 |
| dialkyl amides of organic acids. | dimethylamide of oleic acid | 1.18 |
| | dimethylamide of tolylstearic acid | 0.85 |
| | dimethylamide of phenylstearic acid | 0.81 |

From the table it will thus be observed that the dialkyl amides of organic acids are superior to any of the other classes of solvents tested, in so far as acid distribution characteristics are concerned. It will also be understood that the aforementioned dialkyl amides have been shown in the above table by way of example only, and that other dialkyl amides may be also successfully employed as extractants in effecting the aforementioned dehydration of organic acids in aqueous solution. Hence, I may also employ such dialkyl amides of organic acids as: N diethyl dodecylbenzamide; N cyclohexyl, N-methyl octanoic amide; N cyclohexyl, N-ethyl benzene sulfonamide; N dimethyl octylbenzene sulfonamide; or N,N' tetraethyl sebacic diamide.

In effecting dehydration of organic acids from their aqueous solutions using the aforementioned dialkyl amides as solvents, conventional solvent extraction processes, known to those skilled in the art, may be practiced as hereinbefore indicated. One preferred modification of the general technique employed in effecting the aforementioned dehydration of aqueous solutions of the relatively lighter organic acids, such as acetic, propionic or butyric acids, comprises a primary contact in an extraction column with one or more of the aforementioned alkyl amides as solvents to absorb a major portion of the acid in the solvent, to produce an extract phase (comprising the absorbed acid and a major portion of the solvent) and a raffinate phase (comprising minor portions of the acid and the solvent in aqueous solution). The extract thus obtained is next dehydrated by contact in a dehydration column with an extraneous entraining agent such as benzene, chlorobenzene, diethyl ether, or dimethyltetrahydrofurane, to remove residual water present in the aforementioned extract phase. The remaining lower water-free portion from the dehydration column, comprising a mixture of the solvent and acid, is next distilled to separate the acid, substantially water-free as a relatively low-boiling fraction, from solvent, the latter being recycled to the primary extraction column as a relatively high-boiling fraction. The overhead mixture from the dehydration column, comprising the entraining agent and water, is next subjected to phase separation, and the residual water is withdrawn as a lower phase and discarded, while the upper phase, comprising the entraining agent is recycled for further use to the dehydration column. The aforementioned raffinate phase may be discarded or subjected to distillation, if so desired, to effect separation of the relatively small portions of acid and solvent present in aqueous solution. Solvent thus separated may be returned to the primary extraction column for re-use.

The following specific examples will serve to illustrate but are not intended in any way to limit unduly the broad scope of the invention.

*Example I*

100 cc. of an aqueous solution of acetic acid (having a concentration of approximately 5%) were admixed with 100 cc. of dimethylamide of oleic acid. The mixture was agitated vigorously and allowed to settle until phase separation was complete. The phases were separated and then analyzed for acid concentration. The water content of the extract phase was determined by using the Karl Fischer reagent. The partition ratio used in judging the extraction efficiency (defined as the grams of acetic acid per 100 cc. of the extract, or solvent layer, divided by the grams of acetic acid per 100 cc. of the raffinate, or water layer) was found to be 1.18, while the percentages of water present in the extract and raffinate phases were found to be 5.2% and 94.7% respectively.

Example II

The procedure of Example I was repeated, employing dimethylamide of tolylstearic acid as the solvent and employing similar quantities of aqueous acetic acid (5% concentration) and solvent. The resulting partition ratio was found to be 0.85, while the percentages of water present in the extract and raffinate phases were found to be 15.4% and 98.3% respectively.

Example III

The procedure of Example I was repeated, employing dimethylamide of phenylstearic acid as the solvent and employing similar quantities of aqueous acetic acid (5% concentration) and solvent. The resulting partition ratio was found to be 0.81, while the percentages of water present in the extract and raffinate phases were found to be 17.5% and 99% respectively.

It should be noted that while a particular embodiment of the process of this invention has been described for purposes of illustration, various modifications and adaptations thereof, which will be obvious to one skilled in the art, may be made within the spirit of the invention as set forth in the appended claims.

Having thus described my invention, what I claim and desire to secure by Letters Patent is:

1. A method for separating an organic acid having at least two carbon atoms per molecule from an aqueous solution thereof which comprises contacting said solution with a solvent comprising a dialkyl amide of an organic acid.

2. A method for separating an organic acid having at least two carbon atoms per molecule from an aqueous solution thereof which comprises contacting said solution with a solvent comprising a dialkyl amide of an organic acid to produce an extract phase and a raffinate phase, and separating said phases.

3. A method for separating an organic acid having at least two carbon atoms per molecule from an aqueous solution thereof which comprises contacting said solution in a treating zone with a solvent comprising a dialkyl amide of an organic acid under conditions such that a major portion of said acid is absorbed in said solvent to produce an extract phase comprising said absorbed acid, a major portion of said solvent and a minor portion of water, and a raffinate phase comprising minor portions of said acid and solvent in aqueous solution, separating said phases, subjecting the extract phase thus obtained to dehydration to obtain a substantially water-free mixture of solvent and acid, and separating said acid from said solvent.

4. A method for separating an organic acid having at least two carbon atoms per molecule from an aqueous solution thereof which comprises contacting said solution in a treating zone with a solvent comprising a dialkyl amide of an organic acid under conditions such that a major portion of said acid is absorbed in said solvent to produce an extract phase comprising said absorbed acid, a major portion of said solvent and a minor portion of water, and a raffinate phase comprising minor portions of said acid and solvent in aqueous solution, separating said phases, contacting said extract phase in a dehydration zone with an entraining agent to obtain a lower water-free portion comprising a mixture of solvent and said acid and an upper portion comprising said entraining agent and water, separately subjecting said upper portion to phase separation to obtain an upper phase comprising said entraining agent and a lower phase comprising water, separating said phases, recycling the entraining agent thus separated to said dehydration zone, separately distilling said lower water-free portion to obtain a relatively low-boiling fraction comprising said acid, substantially water-free, and a relatively high-boiling fraction comprising said solvent, and recycling said solvent to said first-mentioned treating zone.

5. In a process for the catalytic hydrogenation of an oxide of carbon in which is obtained an aqueous solution of a fatty organic acid, the method for separating said acid from said solution which comprises contacting said solution in a treating zone with a solvent comprising a dialkyl amide of an organic acid under conditions such that a major portion of said acid is absorbed in said solvent to produce an extract phase comprising said absorbed acid, a major portion of said solvent and a minor portion of water, and a raffinate phase comprising minor portions of said acid and solvent in aqueous solution, separating said phases, contacting said extract phase in a dehydration zone with an entraining agent to obtain a lower water-free portion comprising a mixture of solvent and said acid and an upper portion comprising said entraining agent and water, separately subjecting said upper portion to phase separation to obtain an upper phase comprising said entraining agent and a lower phase comprising water, separating said phases, recycling the entraining agent thus separated to said dehydration zone, separately distilling said lower water-free portion to obtain a relatively low-boiling fraction comprising said acid, substantially water-free, and a relatively high-boiling fraction comprising said solvent, and recycling said solvent to said first-mentioned treating zone.

6. A process as defined in claim 5 in which the solvent is dimethylamide of oleic acid.

7. A process as defined in claim 5 in which the solvent is dimethylamide of tolylstearic acid.

8. A process as defined in claim 5 in which the solvent is dimethylamide of phenylstearic acid.

9. In a process for the catalytic hydrogenation of an oxide of carbon in which is obtained an aqueous solution of a fatty organic acid, the method for separating said acid from said solution which comprises contacting said solution with a solvent comprising a dialkyl amide of an organic acid.

10. In a process for the catalytic hydrogenation of an oxide of carbon in which is obtained an aqueous solution of a fatty organic acid, the method for separating said acid from said solution which comprises contacting said solution with a solvent comprising a dialkyl amide of an organic acid to produce an extract phase and a raffinate phase, and separating said phases.

11. In a process for the catalytic hydrogenation of an oxide of carbon in which is obtained an aqueous solution of a fatty organic acid, the method for separating said acid from said solution which comprises contacting said solution in a treating zone with a solvent comprising a dialkyl amide of an organic acid under conditions such that a major portion of said acid is absorbed in said solvent to produce an extract phase comprising said absorbed acid, a major portion of said solvent and a minor portion of water, and a raffinate phase comprising minor portions of said acid and solvent in aqueous solution, separating said phases, subjecting the extract phase thus obtained to dehydration to obtain a substantially water-free mixture of solvent and acid, and separating said acid from said solvent.

12. A process as defined in claim 5 in which the solvent is N dimethyl octylbenzenesulfonamide.

13. A process as defined in claim 5 in which the solvent is N, N' tetraethyl sebacic diamide.

WILLIAM E. HANFORD.

REFERENCES CITED

The following references are of record in the file of this patent:

Ralston et al., Journ. Org. Chem., vol. 8, pages 478-488 (1943).